United States Patent
Bjoraker et al.

(10) Patent No.: US 8,011,578 B2
(45) Date of Patent: *Sep. 6, 2011

(54) VOUCHER SYSTEM AND METHOD OF USE

(75) Inventors: Erik BenDon Bjoraker, St. Louis Park, MN (US); Mark A. Schultz, Burnsville, MN (US); Token Lee Oakman, Minnetonka, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,235

(22) Filed: Jun. 11, 2010

(65) Prior Publication Data

US 2010/0250378 A1 Sep. 30, 2010

Related U.S. Application Data

(63) Continuation of application No. 11/281,799, filed on Nov. 17, 2005, now Pat. No. 7,735,726.

(51) Int. Cl.
*G06K 5/00* (2006.01)
*G06K 15/00* (2006.01)
*G06Q 40/00* (2006.01)
*G06Q 20/00* (2006.01)
*G07D 11/00* (2006.01)
*G07F 19/00* (2006.01)

(52) U.S. Cl. .......... 235/380; 235/383; 235/379; 705/39; 705/16

(58) Field of Classification Search .......... 235/380, 235/379, 383; 379/114.2; 705/39, 16, 26.41, 705/38

See application file for complete search history.

(56) References Cited

U.S. PATENT DOCUMENTS

| 4,949,256 | A | 8/1990 | Humble |
| 5,224,173 | A | 6/1993 | Kuhns et al. |
| 5,553,155 | A | 9/1996 | Kuhns et al. |
| 5,621,640 | A | 4/1997 | Burke |
| 5,748,908 | A | 5/1998 | Yu |
| 6,044,360 | A | 3/2000 | Picciallo |
| 6,064,977 | A | 5/2000 | Haverstock et al. |
| 6,072,870 | A | 6/2000 | Nguyen et al. |
| 6,088,682 | A | 7/2000 | Burke |
| 6,119,105 | A | 9/2000 | Williams |
| 6,467,684 | B2 | 10/2002 | Fite et al. |
| 6,505,171 | B1 * | 1/2003 | Cohen et al. ............... 705/26.41 |
| 6,606,606 | B2 | 8/2003 | Starr |
| 6,615,190 | B1 | 9/2003 | Slater |

(Continued)

OTHER PUBLICATIONS

USDA, "The Food Stamp Training Guide for Retailers," Sep. 2005, 28 pages.

(Continued)

*Primary Examiner* — Thien Mai
(74) *Attorney, Agent, or Firm* — Griffiths & Seaton PLLC

(57) ABSTRACT

A system for managing voucher use includes a database, a voucher, and a processor. The database stores an account defining at least one approved item available for purchase and a financial balance. The voucher includes an identifier linking the voucher to the account. The processor is in communication with the database and is adapted to use the identifier to access the account. The processor is adapted to determine if an item selected for purchase is an approved item and to apply at least a portion of the financial balance toward the purchase of the selected item only if the selected item is an approved item. Other voucher systems and associated methods are also disclosed.

20 Claims, 7 Drawing Sheets

U.S. PATENT DOCUMENTS

| | | | |
|---|---|---|---|
| 6,820,059 B2 | 11/2004 | Wood et al. | |
| 6,836,692 B2 | 1/2005 | Carrott et al. | |
| 7,050,554 B2 * | 5/2006 | Parfait et al. | 379/114.2 |
| 7,076,465 B1 | 7/2006 | Blagg et al. | |
| 7,143,064 B2 | 11/2006 | Picciallo et al. | |
| 7,249,097 B2 | 7/2007 | Hutchison et al. | |
| 7,308,426 B1 | 12/2007 | Pitroda | |
| 7,337,947 B1 | 3/2008 | Swanson, Sr. | |
| 7,735,726 B2 * | 6/2010 | Bjoraker et al. | 235/380 |
| 2001/0042784 A1 | 11/2001 | Fite et al. | |
| 2002/0010679 A1 | 1/2002 | Felsher | |
| 2002/0052756 A1 | 5/2002 | Lomangino | |
| 2002/0055911 A1 | 5/2002 | Guerreri | |
| 2003/0033246 A1 | 2/2003 | Slater | |
| 2003/0055779 A1 | 3/2003 | Wolf | |
| 2003/0055782 A1 * | 3/2003 | Slater | 705/39 |
| 2003/0061153 A1 | 3/2003 | Birdsong et al. | |
| 2003/0083930 A1 | 5/2003 | Burke | |
| 2003/0097331 A1 | 5/2003 | Cohen | |
| 2003/0140007 A1 | 7/2003 | Kramer et al. | |
| 2003/0154163 A1 | 8/2003 | Phillips et al. | |
| 2004/0111329 A1 | 6/2004 | Moore | |
| 2004/0182922 A1 | 9/2004 | Talarico, Jr. | |
| 2004/0210484 A1 | 10/2004 | Lee | |
| 2004/0215963 A1 | 10/2004 | Kaplan | |
| 2004/0249752 A1 | 12/2004 | Prato et al. | |
| 2005/0021405 A1 | 1/2005 | Agarwal | |
| 2005/0075969 A1 * | 4/2005 | Nielson et al. | 705/38 |
| 2005/0125295 A1 * | 6/2005 | Tidwell et al. | 705/16 |
| 2005/0165682 A1 | 7/2005 | Duke | |
| 2005/0205662 A1 | 9/2005 | Nelson | |
| 2006/0041505 A1 | 2/2006 | Enyart | |
| 2006/0076400 A1 * | 4/2006 | Fletcher | 235/379 |
| 2006/0157557 A1 | 7/2006 | Lee et al. | |
| 2006/0249569 A1 | 11/2006 | Jain | |
| 2006/0289636 A1 * | 12/2006 | Hoblit | 235/383 |
| 2007/0119920 A1 | 5/2007 | Hogg et al. | |
| 2007/0119921 A1 | 5/2007 | Hogg et al. | |
| 2007/0130062 A1 | 6/2007 | Huh | |
| 2007/0250442 A1 | 10/2007 | Hogan et al. | |
| 2008/0010189 A1 | 1/2008 | Rosenberger | |
| 2008/0065532 A1 | 3/2008 | De La Motte | |

OTHER PUBLICATIONS

Barrett, Devlin, "Katrina Victims to Get $2K Debit Cards," Yahoo! News, Sep. 2005., 2pgs., http://www.news. yahoo.com/s/ap20050907/ap_on_re_us/katrina_debit_cards&printer=1;_ylt=AiSj0ymML.T . . . .

\* cited by examiner

VOUCHER SYSTEM AND METHOD OF USE

CROSS-REFERENCE TO RELATED APPLICATION

This application is a continuation of and claims priority under 35 U.S.C. §120 to U.S. patent application Ser. No. 11/281,799 filed Nov. 17, 2005, now U.S. Pat. No. 7,735,726, issued Jun. 15, 2010, and entitled "Voucher System and Method of Use," which is incorporated herein in its entirety.

BACKGROUND OF THE INVENTION

Relief agencies and other organizations are a source of comfort and assistance to individuals and families in times of need. One type of assistance commonly provided by relief agencies is financial assistance. For instance, certain relief agencies provide recipients with vouchers for use as payment for food, clothing, and other necessities at one or more retail stores, markets, or special relief outlets. Conventional vouchers are not provided in any particular physical format. Some vouchers may be printed on a small paperboard card while others are printed on a letter-size piece of paper. Vouchers generally are printed with a monetary value for which the voucher can be redeemed and are associated with a list of approved products that can be purchased with the voucher and/or restricted products that cannot be purchased with the voucher.

During use, recipients typically present vouchers to a cashier at the point-of-sale (POS) terminal of a retail or other redemption site either before, during, or after a plurality of items have been processed for sale. The cashier first attempts to verify the validity of the voucher, which is often complicated by the lack of physical uniformity in the vouchers. Once the voucher is verified, the cashier examines each item being purchased and determines if a particular voucher can be applied toward the purchase of that item (i.e., the employee must determine if the items are approved or restricted items). This task is complicated in mixed transactions in which the voucher can be applied toward some but not all of the products being purchased in a single transaction.

Cashiers also police use of the voucher only for purchases up to the amount specified on the voucher. For instance, if the voucher is for $100 in food supplies, the cashier polices the transaction to be sure the voucher is not applied to cover all of a $102 food supply purchase. In view of the above, the cashier is required to enforce any voucher terms of use defined by the issuing relief agency. However, by requiring cashiers to enforce voucher terms of use in addition to their typical duties and in view of the number of variables to be policed, the opportunities for errors in processing the vouchers, and the recipient time spent at the POS terminal during check-out, increase.

In addition, relief agencies typically require an accounting of what items were purchased with the vouchers. In one conventional voucher system, such accountability requires a cashier to obtain a bar code or other identifier corresponding to the relief agency that provided the voucher. The identifier is entered into the POS terminal along with a serial number of the particular voucher being used to pay for at least a portion of the purchase. This act once again relies on the cashier to find and select the appropriate relief agency identifier and to properly enter all related information into the POS terminal. Not only does this provide additional opportunities for error, but it also delays the check-out process, which may frustrate the recipient as well as other consumers waiting to process their purchases at the POS terminal.

SUMMARY OF THE INVENTION

One aspect of the present invention provides a system for managing voucher use. The system includes a database, a voucher, and a processor. The database stores an account defining at least one approved item available for purchase and a financial balance. The voucher includes an identifier linking the voucher to the account. The processor is in communication with the database and is adapted to use the identifier to access the account. The processor is adapted to determine if an item selected for purchase is an approved item and to apply at least a portion of the financial balance toward the purchase of the selected item only if the selected item is an approved item. Other related products, systems, and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
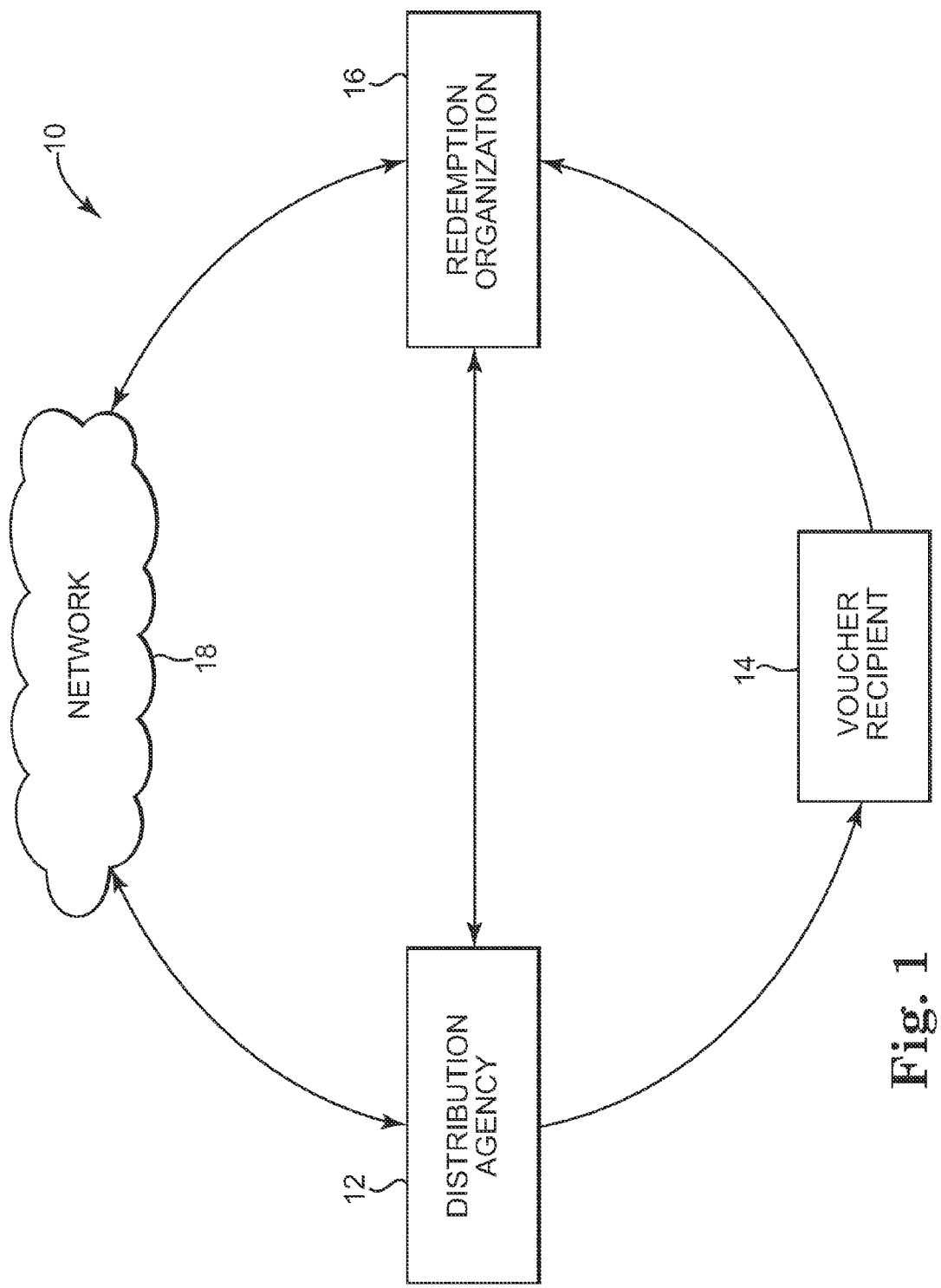
FIG. 1 is a block diagram illustrating one embodiment of a voucher system, according to the present invention.

Relief or other distribution agencies distribute financial transaction instruments or vouchers to needy recipients for use toward purchases of goods and/or services from a retail store or other redemption site. In one embodiment, the voucher takes the form of a stored-value card adapted for making purchases of goods and/or services from e.g. a retail store or website. The voucher includes an account identifier, such as a bar code, a magnetic strip, and/or a radio frequency identification device (RFID) tag, that links the voucher to an account. In one embodiment, the account specifies a particular distribution agency that provided the voucher, an available balance or value of the voucher, and which items are approved (i.e. which items can be purchased with the voucher). The account is electronically accessible via the account identifier and permits electronic enforcement of voucher terms of use as defined by the distribution agency.

For example, in one embodiment, the retail store or other redemption organization is configured to process a transaction for sale of goods and/or services at the point-of-sale (POS) terminal and to scan or otherwise enter the account identifier included on the voucher. Upon scanning the account identifier, the POS terminal and associated network is configured to electronically determine whether each item being purchased falls within the approved and/or restricted items list defined in the associated voucher account and to apply the available balance toward the purchase of the approved and non-restricted items. Since the redemption parameters of the stored-value card (i.e., the available balance and list of approved/restricted items) are electronically processed by the POS terminal rather than by the associated cashier, the risk of error in processing the voucher and the time required to process a purchase using the voucher are greatly diminished.

In one embodiment, the POS terminal is linked to a redemption organization network that is configured to log use of the stored-value card and to report detailed lists of voucher use to the distribution agency. In this manner, the distribution agency is able to track which distributed vouchers have been redeemed, what the redeemed vouchers have been used to purchase, and/or whether any residual balances remain on the vouchers. In one example, the distribution agency is able to access such tracking information, to order additional vouchers, and/or to manage voucher accounts via a network, such as the Internet.

Components of the voucher systems described below and employed to carry out the methods described below can be implemented in hardware via a microprocessor, programmable logic, or state machine, in firmware or in software with a given device. In one aspect, at least a portion of the software programming is web-based and written in Hyper Text Markup Language (HTML) and/or Java programming languages, including links to user interfaces for data collection, such as a Windows based operating system. Each of the main components may communicate via a network using a communication bus protocol. For example, the present invention may use a Transmission Control Protocol/Internet Protocol (TCP/IP) suite for data transport. Other programming languages and communication bus protocols are suitable for use to support methods described herein and will become apparent to those skilled in the art after reading this disclosure. Components of the present invention may also reside in software on one or more computer-readable mediums. The term "computer-readable medium" as used herein is defined to include any kind of memory, whether volatile or non-volatile such as floppy disk, hard disk, CD-ROMs, flash memory, read-only memory (ROM) and random access memory (RAM).

Turning to the figures, FIG. 1 illustrates a block diagram of a voucher system 10 including a distribution agency 12, a voucher recipient 14, and a redemption organization 16. Distribution agency 12 is any party that provides financial assistance in the form of vouchers to recipients 14. In one embodiment, distribution agency 12 is a relief agency such as a homeless shelter, the Red Cross, the Salvation Army, the Federal Emergency Management Agency (FEMA), a state department of health, or other relief agency that distributes vouchers to recipients 14 that are victims of poverty, natural disasters, and/or other compromising or emergency situations.

Redemption organization 16 is any site or network of sites adapted to accept the vouchers as payment for items such as goods and/or services purchased by the recipients 14. One embodiment of redemption organization 16 is more particularly illustrated in FIG. 2. Redemption organization 16 includes approved items 20 for purchase, a POS terminal 22 configured to process purchases made with vouchers, a management database 24, and a database processor or controller 26.

In one embodiment, approved items 20 and POS terminal 22 are each included in a redemption site 30 within redemption organization. Redemption site 30 is any retail or wholesale outlet configured to redeem a voucher in exchange for approved items 20. POS terminal 22 includes a reader 28 configured to read an identifier on the voucher and a processor or controller 29 configured to determine if the items 20 being purchased are approved by the distribution agency 12 and to redeem the value of the voucher toward the purchase of any approved items 20. Reader 28 is one example of means for reading an identifier of the voucher. In one embodiment, a plurality of redemption sites 30 are included within redemption organization 16.

In one embodiment, redemption organization 16 is additionally configured to supply distribution agency 12 with vouchers to distribute to recipients 14 and to support voucher issuance and management. In one example, management database 24 and database processor 26 are part of a voucher administrator 38 included within redemption organization 16. Management database 24 includes data for tracking and managing voucher use. Database processor 26 is coupled with management database 24 and is adapted to processing information stored and to be stored in management database 24.

In one embodiment, management database 24 includes a voucher account storage module 32, a distribution agency profile storage module 34, and/or a generated reports storage module 36. Voucher account storage module 32 stores a plurality of voucher accounts, which are each linked to a voucher. Each voucher account specifies a balance for the associated voucher as well as the voucher terms of use as will be further described below. Distribution agency profile storage module 34 includes information regarding distribution agency 12 for managing vouchers distributed by distribution agency 12 such as contact and financial information for distribution agency 12. Generated report storage module 36 stores any voucher use reports, bills, etc. previously generated by redemption organization 16 for distribution to distribution agency 12 by processor 26.

Referring once again to FIG. 1, distribution agency 12 is in communication with recipients 14 and provides a voucher to each recipient 14 for use toward the purchase of items defined as approved by distribution agency 12. For example, the voucher may be designated as approved for the purchase of one or more item of clothing, food, etc. and/or designated as not approved for the purchase of alcohol, tobacco, electronics, etc. Recipient 14 subsequently takes the voucher to a retail or other redemption site 30 (FIG. 2) operated by redemption organization 16 for use toward the purchase of approved items.

In one embodiment, redemption organization 16 accepts the voucher as payment only toward approved and non-restricted items. In addition, redemption organization 16 electronically tracks the purchase(s) made by recipient 14 utilizing the voucher and provides data regarding voucher transactions to distribution agency 12. In one embodiment, redemption organization 16 communicates with and/or otherwise makes information available to distribution agency 12 via a network 18, such as the Internet. Although illustrated as including one distribution agency 12, one recipient 14, and one redemption organization 16, it should be understood that, in one embodiment, a plurality of distribution agencies 12, a plurality of recipients 14, and/or a plurality of redemption organizations 16 are included in voucher system 10.

Figure 2:
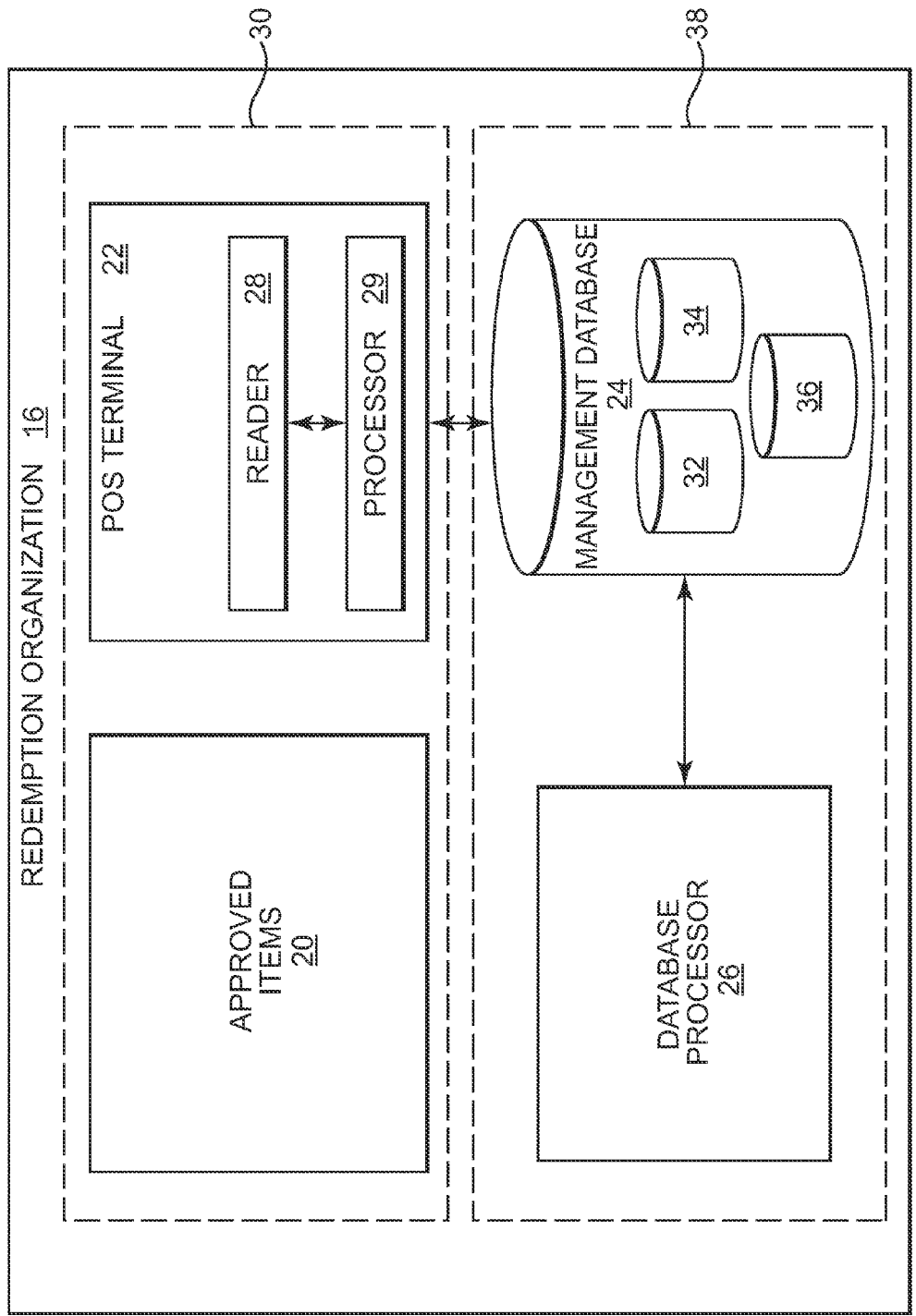
FIG. 2 is a block diagram of a redemption organization of the voucher system of FIG. 1.
Figure 3:
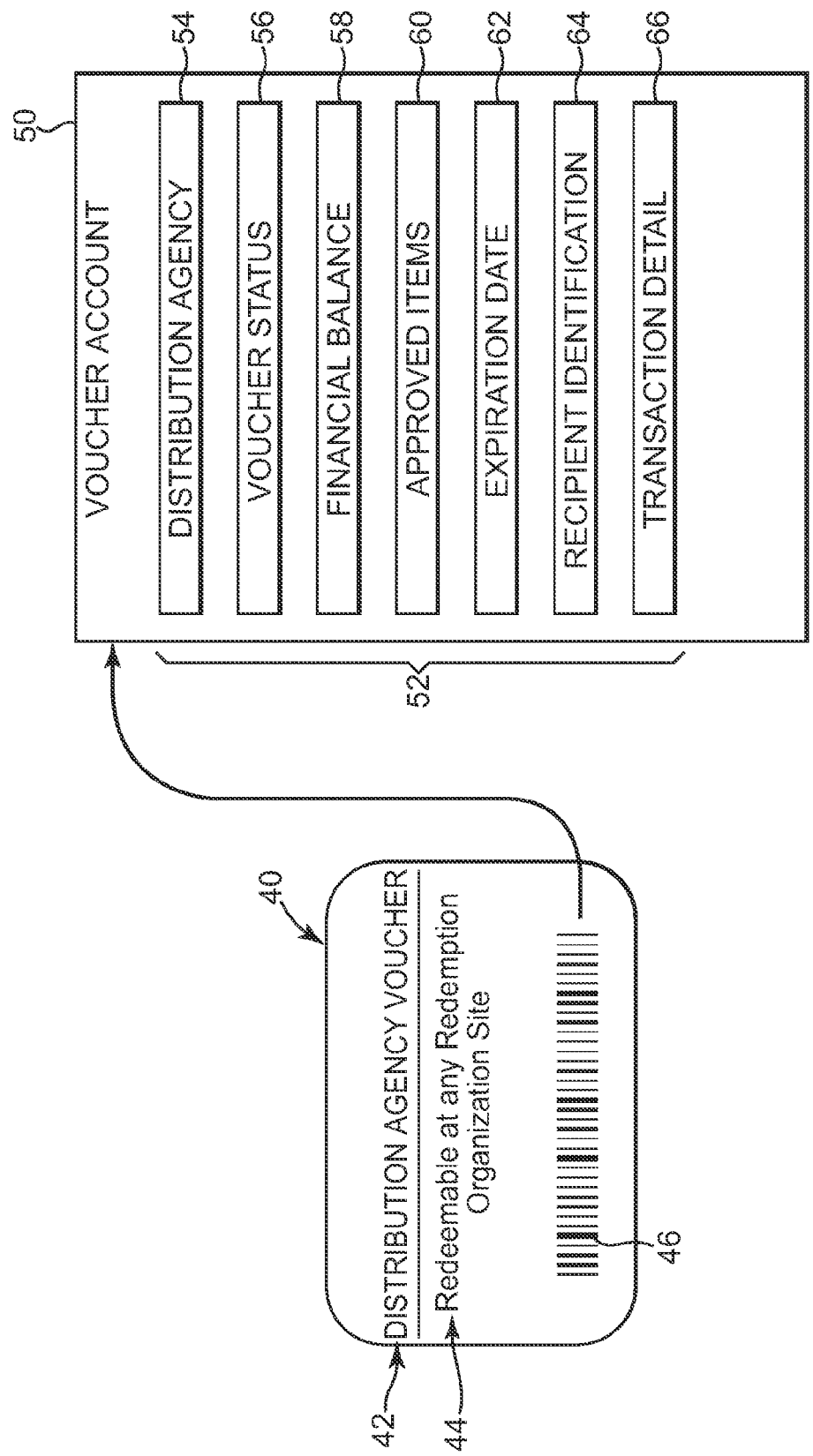
FIG. 3 is a schematic illustration of one embodiment of a voucher and associated voucher account, according to the present invention.

As illustrated in FIG. 3, in one embodiment, a financial transaction instrument or voucher 40 is a stored-value card or other financial transaction card. In one embodiment, voucher 40 includes printed matter 42 or other indicia identifying what distribution agency 12 distributed voucher 40, printed matter or other indicia 44 designating a redemption organization 16 configured to redeem voucher 40, and an account identifier 46. Account identifier 46 links voucher 40 to an associated voucher account 50. Account identifier 46 includes at least one of a bar code, a magnetic strip, a radio frequency identification device (RFID) tag, or other suitable link to account 50. In one embodiment, account 50 is maintained by redemption organization 16 within voucher account storage module 32 (FIG. 2) and includes information regarding voucher 40. In one embodiment, voucher 40 is any stored-value card or other item including account identifier 46 configured to electronically link voucher 40 to account 50.

Account 50 includes various information fields 52 such as a distribution agency identification field 54, a voucher status field 56, a financial balance field 58, an approved items field 60, an expiration date field 62, a recipient identification data field 64, and/or a transaction details field 66. In one embodiment, account 50 includes alternative or additional information, such as a particular redemption site at which voucher 40 can be redeemed, a designation of voucher 40 as a one-time use card, etc. In one embodiment, fields 52 facilitate redemption organization 16 in redeeming voucher 40 and distribution agency 12 in monitoring use of vouchers 40 as will be further described below.

Voucher status field 56 designates whether voucher 40 is activated or non-activated. Activated vouchers 40 can be used toward the purchase of items, whereas non-activated vouchers 40 cannot be used toward the purchase of items. In one embodiment, distribution agency 12 receives non-activated vouchers 40 from redemption organization 16. Distribution agency 12 activates vouchers 40 as needed prior to the distribution of voucher 40 to recipient 14. By maintaining a majority of vouchers 40 stored by distribution agency 12 as non-activated, the motivation for theft of such vouchers from distribution agency 12 is decreased. In one embodiment, other account fields 52 such as financial balance field 58, approved items field 60, and expiration date field 62 are unpopulated until after activation and/or use of voucher 40.

The financial balance field 58 indicates the current value of voucher 40. In one embodiment, non-activated vouchers 40 have a financial balance of zero dollars. In one embodiment, non-activated vouchers 40 alternatively have a preset financial balance of $100, $150, $500, etc. However, if voucher 40 is non-activated, any financial balance in account 50 is not generally accessible for use toward the purchase of items. In one embodiment, the financial balance is specified by distribution agency 12 during activation of voucher 40.

In one embodiment, when an activated voucher 40 is distributed to recipient 14, the financial balance is equal to the initial balance added to voucher 40 by distribution agency 12, for example, $500. As voucher 40 is redeemed for purchases, the financial balance is automatically updated by POS terminal 22. For example, if voucher 40 is redeemed for $150 in food items, financial balance field 58 is updated to indicate a remaining balance of $350, and so on. In one embodiment, additional value can be added or "loaded" onto voucher 40. In such instances, financial balance field 58 is updated, more particularly, is increased, to indicate additional available funds to recipient 14. In one example, distribution agency 12 adds a predetermined value to voucher 40 after the expiration of a given time period. For instance, distribution agency 12 may add an amount such as $200 to voucher 40, and therefore, updates financial balance field 58, at the end of each month or other time period.

Approved items field 60 defines the subset of items for which voucher 40 can be applied to purchase. In one example, approved items field 60 may designate individual items, items types, and/or departments of items that voucher 40 can or cannot be used to purchase. In one embodiment, approved items field 60 designates approved items using a categorical distinction referring to the type of distribution being offered (i.e. food, clothing, food and clothing, etc.) wherein the redemption organization automatically equates the categorical distinction with particular types of items available in its stores. In one embodiment, approved items field 60 defines approved items as items not included in a stored list of restricted items. For example, if a list of restricted items only includes alcohol, tobacco, and electronics items, any food or clothing item would be an approved item since such items are not included in the list of restricted items.

In one embodiment, account 50 includes an expiration date field 62. Expiration date field 62 indicates a date or other occurrence upon which voucher 40 can no longer be redeemed. In one embodiment, following the expiration date, distribution agency 12 may recapture any residual balance on voucher 40. In one embodiment, expiration date field 62 includes any other information regarding when the residual balance, if any, on voucher 40 can be reclaimed by distribution agency 12. In other embodiments, account 50 does not include expiration date field 62.

In one embodiment, account 50 includes recipient identification field 64. Recipient identification field 64 includes information such as a name, address, driver's license number, social security number, etc. Recipient identification field 64 simplifies tracking of an individual recipient's use of voucher 40. In one embodiment, recipient identification field 64 is useful in decreasing abuse of vouchers 40. For example, during attempted redemption of voucher 40 as at least partial payment for one or more items, a cashier or other redemption organization employee may ask the current card bearer for some identifying information, compare the card bearer response to stored recipient information field 64. If the card bearer response matches the data in recipient information field 64, the card bearer is identified as the rightful recipient (i.e., the party given voucher 40 by distribution agency 12). If the voucher bearer is the rightful recipient, then voucher redemption continues; if the voucher bearer is not the rightful recipient, then voucher redemption is prevented. Accordingly, misuse and misappropriation of voucher 40 can be decreased.

Transaction detail field 66 is typically blank or indicates that no detail is available for non-activated vouchers 40 and for activated vouchers 40 that have not yet been redeemed toward the purchase of an item. Following redemption of an activated voucher 40, transaction detail field 66 is populated with details regarding when, where, and on what voucher 40 was redeemed. In one embodiment, transaction detail field 66 lists either specific product information, such as the size, brand, style, etc. of the item purchased (i.e., size 9, Brand X, boot cut jeans), or more general information identifying the item purchased (i.e., women's jeans) purchased at least in part with voucher 40. Subsequent redemptions of voucher 40, if any, further update transaction detail field 66 with similar details of additional items purchased at least in part with voucher 40.

Figure 4:
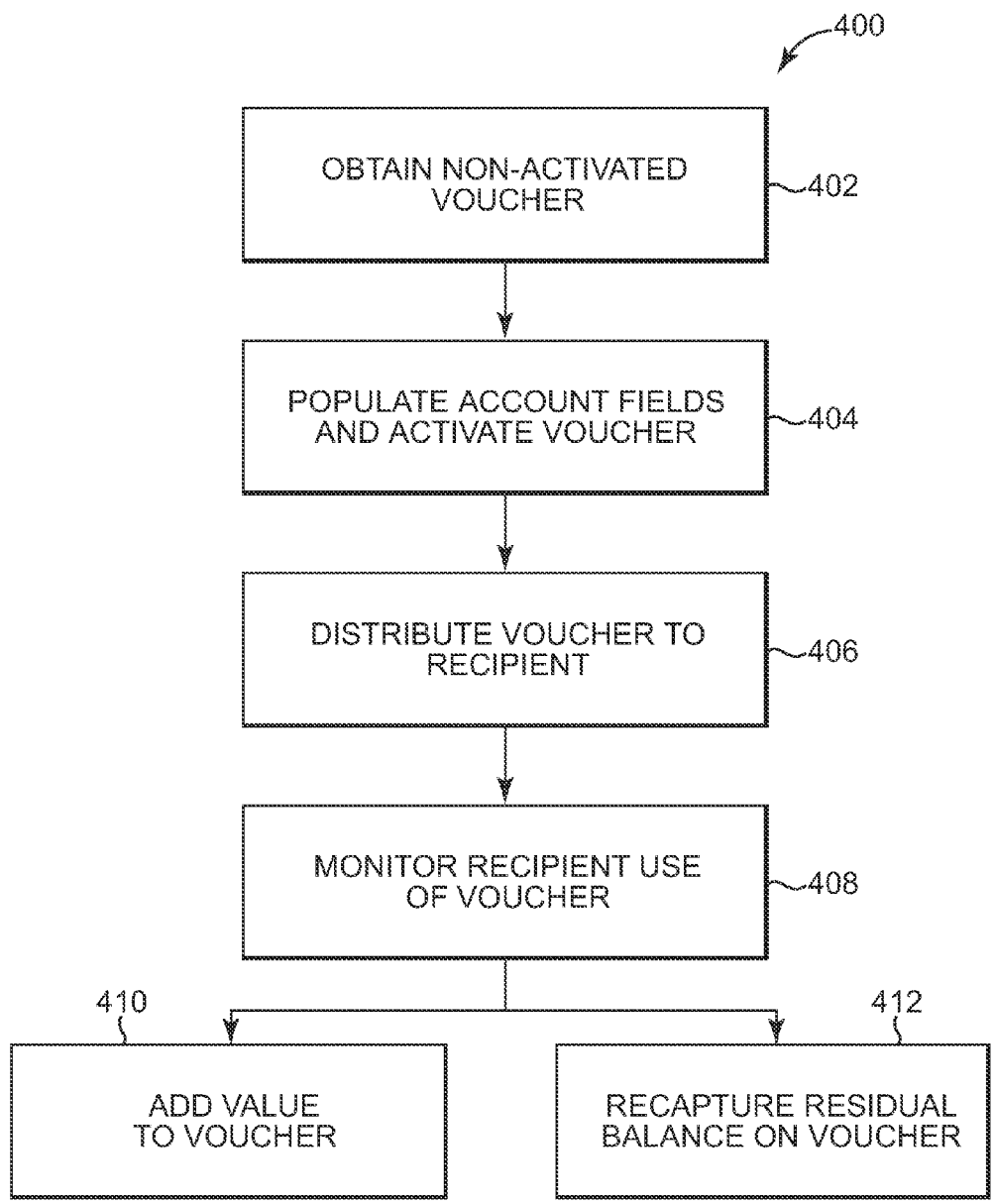
FIG. 4 is a flow chart illustrating one embodiment of a method of distributing vouchers.

FIG. 4 is a flow chart illustrating one embodiment of a method of distributing vouchers generally at 400, which is described below with respect to FIGS. 1 and 3. At 402, distribution agency 12 obtains one or more non-activated vouchers 40. In one embodiment, distribution agency 12 manufactures vouchers, is issued vouchers 40 from redemption organization 16, or otherwise obtains vouchers 40. Vouchers 40 obtained at 402 generally are already linked to account 50 via account identifier 46. In one embodiment, one or more account fields 52 are populated upon distribution agency 12 obtaining voucher 40. For example, distribution agency field 54 is populated with the name of the particular distribution agency 12, such as the Red Cross, the Salvation Army, FEMA, a state department of health, etc.

At 404, distribution agency 12 activates one or more vouchers 40 to be distributed to recipients 14. During activation, distribution agency 12 accesses and populates account fields to ready account 50 for voucher use. In one embodiment, distribution agency 12 specifies a value for financial balance field 58, identifies approved items for field 60 populates expiration field 62 and/or populates recipient data field 64. In one embodiment, approved items field 60 includes a listing of individual approved item types, specifies approved item categories, lists restricted items, and/or specifies restricted item categories. Once the desired fields 52 are populated, status of account field 56 is changed from "non-activated" to "activated."

At 406, distribution agency 12 issues voucher 40 to recipient 14. In one embodiment, during issuance of voucher 40 to recipient 14, distribution agency 12 populates recipient identification data field 64 in account 50, if recipient identification data field 64 was not previously populated. In one embodiment, no recipient identification data field 64 is included in account 50. Once presented with voucher 40, recipient 14 is able to use voucher 40 toward the purchase of approved items from redemption organization 16. In one embodiment, at 408, distribution agency 12 monitors use of voucher 40 after voucher 40 is distributed to recipient 14. Distribution agency 12 may monitor voucher use via reports generated by processor 26, as will be further described below.

In one embodiment, at 410, distribution agency 12 adds additional value to voucher 40 by accessing account 50. For example, after issuing voucher 40, distribution agency 12 may add a predetermined amount, such as $500, to the financial balance field 58 at the beginning of each month. In some instances, at 412, distribution agency 12 recaptures any unredeemed financial balance on voucher 40 after recipient 14 use of voucher 40 or upon the passing of an expiration date or other occurrence specified in expiration date field 62 of account 50. In one embodiment, method 400 does not include one or more of operations 408, 410, and 412. The method 400 is repeated as desired for a plurality of recipients 14.

Figure 5:
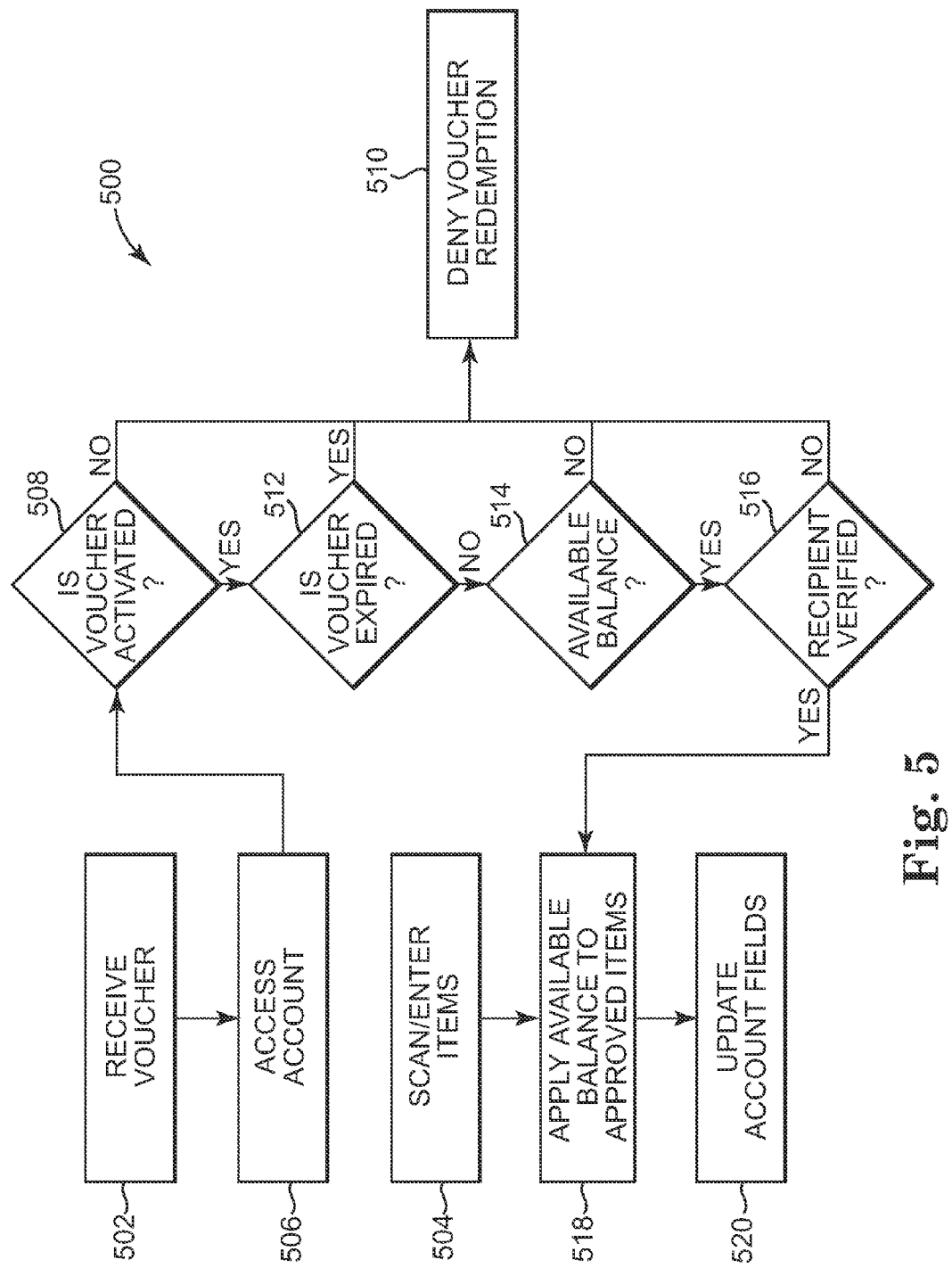
FIG. 5 is a flow chart illustrating one embodiment of a method of redeeming vouchers.

FIG. 5 is a flow chart illustrating one embodiment of a method of redeeming vouchers generally indicated at 500 and is described with additional reference to the embodiments of FIGS. 1, 2, and 3. At 502, redemption organization 16, more particularly a cashier for redemption organization 16, receives voucher 40 from recipient 14 during a transaction. In one embodiment, voucher 40 is received before, after, or during the scanning or other method of entering items 20 to be purchased by recipient 12 into POS terminal 22 at 504. At 506, account 50 linked to voucher 40 is accessed by redemption organization 16 by scanning or otherwise reading account identifier 46 of voucher 40 into POS terminal 22, which is coupled with management database 24 storing account 50. In one embodiment, POS terminal 22 is coupled with management database 24 via a networked or direct connection. Account identifier 46 is used similar to an address to locate and access the appropriate account 50. Once account 50 is accessed at 506, POS terminal 22 has access to at least some of account fields 52 and processes use of voucher 50 per the voucher terms of use defined therein. In view of the above, POS terminal 22 coupled with management database 24 is one example of means for accessing account 30 using account identifier 46.

For example, at 508, voucher status field 56 is examined to determine if voucher 40 is activated. If voucher 40 is not activated, it is an indication that voucher 40 may have been stolen or wrongfully appropriated by the current bearer of voucher 40. Accordingly, if voucher 40 is not activated, then at 510, redemption organization 16 denies use of voucher 40 toward the purchase of items 20. If voucher 40 is activated, method 500 continues to operation 512.

At 512, expiration date field 62 of account 50 is examined to determine if voucher 40 has expired for any reason. If voucher 40 has expired, then at 510, redemption organization 16 denies use of voucher 40 toward the purchase of items 20. If voucher 40 has not expired, method 500 continues to operation 514. In one embodiment, operation 512 is omitted from method 500.

At 514, financial balance field 58 of account 50 is examined to determine if voucher 40 has any remaining balance to be applied toward the purchase of items from redemption organization 16. If it is determined that no available balance remains on voucher 40, then at 510, redemption organization 16 denies use of voucher 40 toward the purchase of items 20. If it is determined that an available balance remains on voucher 40, method 500 continues to operation 516.

At 516, recipient identification field 64 of account 50 is examined in view of identification information, such as a name, address, telephone number, social security number, driver's license number, etc., presented to POS terminal 22 directly or via a cashier. If the information provided by the voucher bearer fails to match information stored to recipient identification field 64, then at 510, redemption organization 16 denies use of voucher 40 toward the purchase of items 20. If the information provided by the bearer of voucher 40 matches information stored to recipient identification field 64, then method 500 continues to operation 518. In one embodiment, operation 516 is omitted from method 500. Although generally described and illustrated as occurring sequentially from operation 508 to operation 516, in one embodiment, operations 508, 512, 514, and 516 may be performed in any order or substantially simultaneously. Moreover, other operations may be added to or substituted for any of operations 508, 512, 514, and 516.

At 518, the available balance on voucher 40 (as determined at 512) is applied toward the purchase of approved items 20 from redemption organization 16. More specifically, POS terminal 22 compares the contents of approved items field 60 to the items scanned for purchase at 504. If any of the scanned items falls within the designation of approved items in field 60, then POS terminal 22 applies the available balance of voucher 40 toward the purchase of such items. Accordingly, POS terminal 22 in communication with management database 24 is one example of means for determining whether items to be purchased are approved items. At 518, POS terminal 22 automatically regulates voucher use to prevent use of voucher 40 for amounts over the financial balance indicated by account 50.

At 520, one or more account fields 52 are updated. In particular, the total cost of approved items purchased with voucher 40 is subtracted from the financial balance in field 58 such that the financial balance field 58 represents the current available balance of voucher 40. For example, if financial balance field 58 indicated a voucher available balance of $500 at 512, and if at 516, the balance was applied toward $350 of allowable items, then the financial balance field 58 is updated at 520 to indicate a new available balance of $150. Accordingly, POS terminal 22 is communication with management database 24 is one example of means for applying voucher 40 toward a cost of items in a purchase.

In one embodiment, transaction detail field 66 is also updated at 520. For example, the details of the voucher transaction including such information as generally or specific item descriptions, the item cost, and any other information relating to the approved items purchased with voucher 40 are logged to transaction detail field 66 for subsequent review by distribution agency 12. POS terminal 22 in communication with transaction detail field 66 is one example of means for collecting data about the purchase and for storing the collected data. In one embodiment, although redemption organization 16 can write to transaction data field 66, transaction data field 66 is only readable by distribution agency 12. Any other fields 52 are also updated as necessary or desired.

Method 500 illustrates that enforcement of voucher use is automatically effectuated by POS terminal 22 and the associated electronic network of redemption organization 16, which decreases the chance of error as compared to conventional systems where the cashier was entrusted with policing voucher use.

Figure 6:
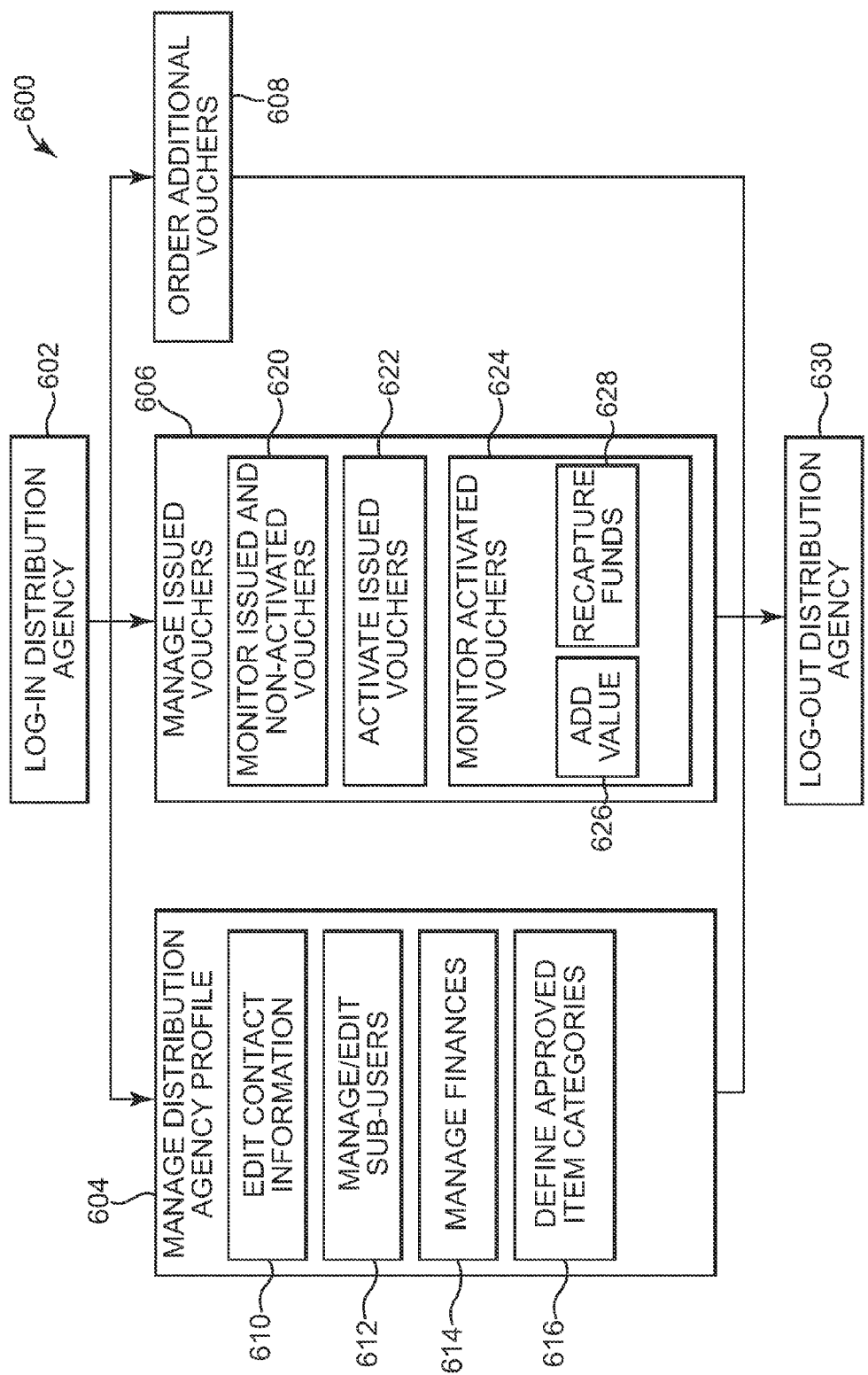
FIG. 6 is a flow chart illustrating one embodiment of a method of managing voucher use as supported by a redemption organization of FIG. 1.

FIG. 6 illustrates one embodiment of a method of voucher management generally indicated at 600. Method 600 is described with reference to FIGS. 1 and 3. In one embodiment, method 600 is performed over network 18, such as an intranet or the Internet. More specifically, in one embodiment, redemption organization 16 provides and services a website accessible by distribution agency 12, which supports performance of method 600 by distribution agency 12. Accordingly, the website includes any suitable user graphical interfaces for presenting the various operations of method 600 and associated data stored in management database 24 as described below to distribution agency 12.

At 602, distribution agency 12 logs-in to the website provided by voucher administrator 38 (FIG. 2) of redemption organization 16 to manage voucher use. In particular, an individual associated with distribution agency 12 logs-in with a user name and password, which may be a mix of alphanumeric characters, a biometric characteristic, or other suitable password. Use of a log-in generally decreases unauthorized use of the management website. Following log-in at 602, distribution agency 12 is able to manage account profile 604, manage issued vouchers 606, and/or order additional voucher 608.

At 604, distribution agency 12 manages the associated distribution agency profile stored to distribution agency profile storage module 34 (FIG. 2) of redemption organization 16. In one embodiment, each distribution agency profile includes information to facilitate the workings of voucher system 10, including communication between distribution agency 12 and redemption organization 16. In one embodiment, managing a distribution agency profile at 604 includes one or more of editing distribution agency contact information at 610, managing or editing sub-users for distribution agency at 612, managing finances at 614, and categorically defining approved items lists at 616.

Editing contact information at 610 includes updating or adding one or more physical addresses, email addresses, phone numbers, contact names, etc. where vouchers 40, billings, or other information can be sent to distribution agency 12. Managing or editing sub-users at 612 defines individuals associated with distribution agency 12 and user names and passwords configured to be used by those individuals to manage the voucher program of the distribution agency 12. In one embodiment, at 610, different sub-users are assigned different access levels. For example, one access level may only allow a sub-user to perform one operation of 604, 606, and 608.

At 614, distribution agency 12 reviews finances with regard to vouchers 40, pays voucher bills, etc. For instance, at 614, an account of the money placed on activated cards by distribution agency 12 is tabulated along with fees owed to redemption organization 16, if any, for the redemption of vouchers 40. In one embodiment, managing finances at 614 may include cross-referencing a credit account offered by redemption organization 16.

At 616, distribution agency 12 is able to define approved item categories or restricted item lists for subsequent use in issuing vouchers 40 to recipients 14. In particular, approved and/or restricted items may be grouped into departmental categories such as food, clothing, alcohol, electronics, pharmaceutical, etc. In one embodiment, category definitions may be based upon the type or relief being offered. For example, a category of approved and/or restricted items may be defined for poverty relief, disaster assistance, or any other suitable category. By defining categories at 616, subsequent approved item definitions for individual vouchers 40 can more easily and quickly be identified during voucher activation.

At 606, distribution agency 12 manages issued vouchers 40. Issued vouchers 40 are any vouchers 40 received from redemption organization 16 or other supplier that have not been activated by distribution agency 12 or any other party. Managing issued vouchers 40 at 606 may include one or more of monitoring issued and non-activated vouchers 40 at 620, activating issued vouchers at 622, and monitoring activated vouchers 40 at 624.

Monitoring issued and non-activated vouchers at 620 generally includes viewing a list that accumulates the relevant information about non-activated vouchers 40. In one example, database processor 26 (FIG. 2) of redemption organization 16 generates as list based on accounts 50 stored in management database 24. The list includes a listing of account identifiers 46 of issued but non-activated vouchers 40 as well as any relevant information from account fields 52, such as a current voucher balance, etc. By viewing this list, distribution agency 12 can evaluate if additional vouchers 40 should be ordered from redemption organization 16, etc. In one embodiment, the listing of issued but non-activated vouchers 40 can be filtered or sorted and presented via database processor 26 to distribution agency 12 in any suitable manner as dictated by distribution agency 12.

At 622, distribution agency 12 is able to activated previously issued vouchers 40. In one embodiment, vouchers 40 can be selected for activation from the list viewed at 620 or by entering individual account identifiers 46 into the website. Distribution agency 12 activates vouchers 40 in a manner similar to that described above for operation 404 of method 400 illustrated in FIG. 4. In one embodiment, vouchers 40 are activated over network 18 (FIG. 1) via the website supported by redemption organization 16. In one embodiment, vouchers 40 are activated with redemption organization 16 over a telephone connection.

Monitoring activated vouchers 40, at 624, includes viewing a listing of the account identifiers 46 corresponding to vouchers 40, and thereby accounts 50, that have been activated as well as any relevant information from account fields 52 associated with the listed account identifiers 46 as generated by database processor 26 in view of management database 24. For example, listings of activated vouchers 40 may include one or more of the financial balance of each voucher 40, a designation of whether each voucher 40 has been redeemed, a designation of whether there is transaction detail for each voucher 40, a listing of any transaction details for each voucher 40, etc. In one embodiment, the listing of activated vouchers 40 can be filtered or sorted by database processor 26 in any suitable manner as dictated by distribution agency 12.

In one embodiment, individual account identifiers 46 can be selected from the listing provided at 624, and the associated account 50 can be additionally managed. For example, once an individual account identifier 46 is selected a new graphical interface may be presented to distribution agency 12 that displays more detailed information about the associated account 50. In one embodiment, while in the detailed account mode, value can be added to account 50 at 626 and/or funds can be recaptured from account 50 at 628. In one example, funds may automatically be added to account 50 at the expiration of a given time period or occurrence of any other triggering event and/or funds may be added by action of distribution agency at 626. In one embodiment, a plurality of account identifiers 46 may be selected from the activated account identifier list and funds may be added to accounts 50 associated with the plurality of account identifiers 46 at one time.

Similarly, funds can be recaptured from accounts 50 having residual balances after the expiration date has passed or other triggering event has occurred. Recapturing residual funds allows distribution agency 12 to reclaim any financial balance remaining on voucher 40 after use. Upon recapture at 628, the credit account of distribution agency 12 may be credited or a refund may be issued. In one embodiment, funds from a plurality of accounts 50 are simultaneously recaptured by selecting an associated plurality of account identifiers from the listing of activated vouchers. As such, the website operated by database processor 26 is one example of means for refunding a non-redeemed value of voucher 40. Listings regarding vouchers viewed by distribution agency 12 during one of operations 604 and 606 may be generated by processor 26 in real-time or based on previously generated reports saved to generated reports storage module 36 (FIG. 2) of management database 24.

At 608, distribution agency 12 can order additional vouchers 40 from redemption organization 16 or other supplier. In one embodiment, an order includes how many vouchers 40 are being ordered, what distribution agency 12 is placing the order, and any other specifics regarding the order, such as any preset financial balance, expiration date, etc. for any of vouchers 40. In one embodiment, additional vouchers are ordered at 608 via the website operated by redemption organization 16 or other voucher supplier or over the telephone network. In one embodiment, following completion of an operation 604, 606, or 608 one of the other operations 604, 606, and 608 is completed.

At 630, after operation 604, 606, and/or 608 are completed as desired by distribution agency 12, distribution agency 12 logs off of the website or other portal accessing management database 24 (FIG. 2). It should be noted that any website operated by redemption organization 16 or other party by support operations 604, 606, and 608 with various graphical interfaces as will be apparent to those of skill in the art.

Figure 7:
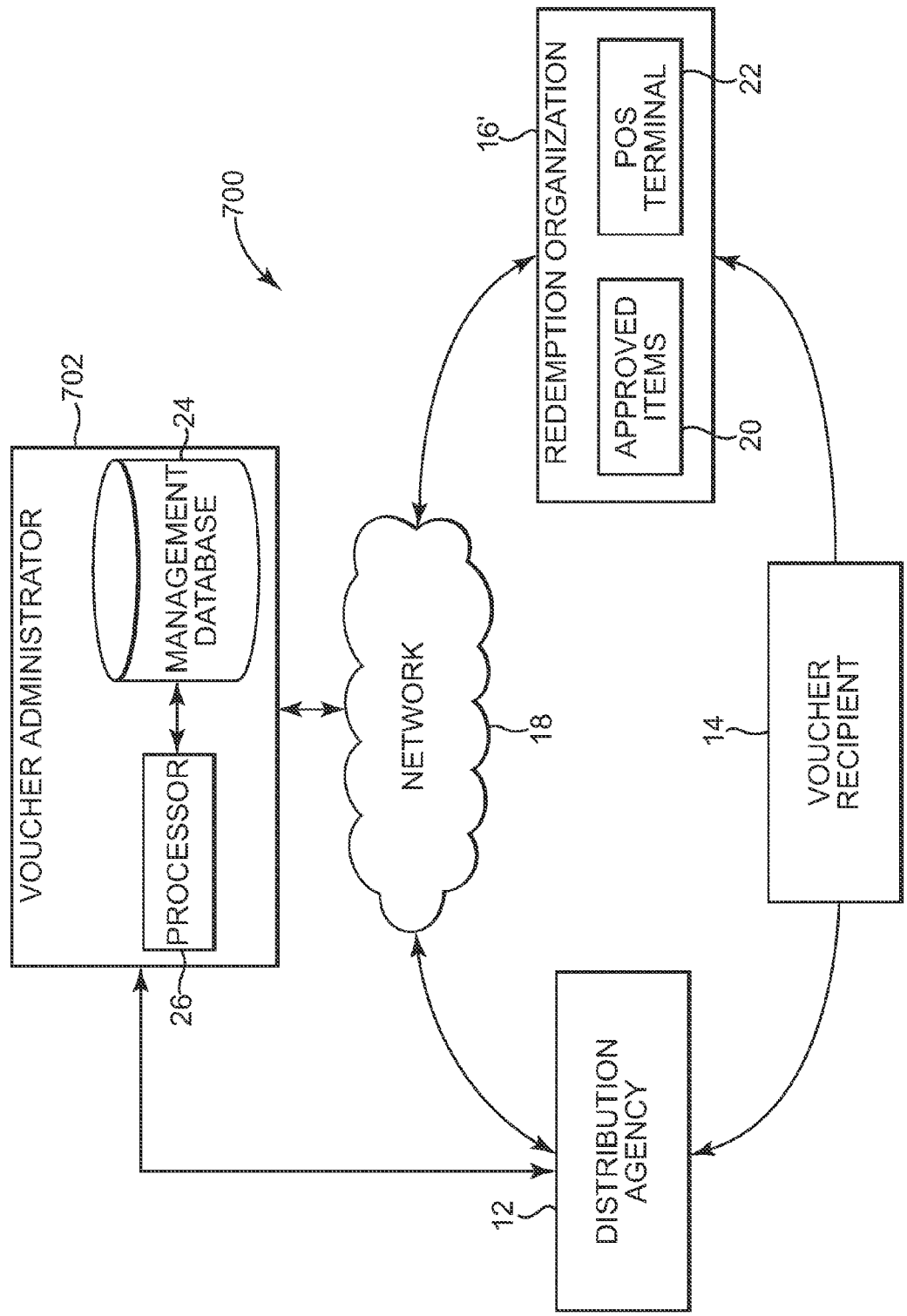
FIG. 7 is a block diagram illustrating one embodiment of a voucher system, according to the present invention.

FIG. 7 illustrates a block diagram of a voucher system 700 similar to voucher system 10 of FIG. 1 but additionally including a voucher administrator 702. Voucher administrator 702 communicates with distribution agency 12 and redemption organization 16' either directly or via network 18. In one embodiment, voucher administrator 702 supplies vouchers 40 to distribution agency 12, maintains management database 24 and processor 26, and supports method 600 and any associated website or network. In this embodiment, redemption organization 16' optionally does not include a voucher administrator 38, processor 26, or database 24 as described above and does not provide distribution agency 12 with voucher management support. Redemption organization 16' is in remote communication with voucher administrator 702 to access at least a portion of account fields 52 to update such fields during or after a transaction with POS terminal 22 involving an associated voucher 40.

In this embodiment, voucher administrator 702 optionally is not be directly linked to a particular redemption organization 16'. In one embodiment, voucher 40 provided by voucher administrator 702 to distribution agency 12 may be redeemed by recipient 14 at any one of a plurality of redemption organizations 16' each having electronic access to voucher accounts 50 via network 18. In one example, each voucher account stored by voucher administrator 702 may include an additional field to be populated by distribution agency 12 that designates one or more of the available redemption organizations 16' that can redeem voucher 40 toward the purchase of items. In one embodiment, voucher administrator 702 is optionally part of distribution agency 12.

Although the invention has been described with respect to particular embodiments, such embodiments are for illustrative purposes only and should not be considered to limit the invention. Various alternatives and changes will be apparent to those of ordinary skill in the art. Other modifications within the scope of the invention in its various embodiments will be apparent to those of ordinary skill.

What is claimed is:

1. A system for managing and facilitating financial transaction instrument use, the system comprising:

a database storing a plurality of accounts each defining approved goods available for purchase and a corresponding prepaid financial balance, wherein:

the corresponding prepaid financial balance is available as payment toward one or more future purchases from any one or more of a plurality of affiliated retail settings, the database being accessible by a distribution agency, and the distribution agency is configured to access the plurality of accounts to assign the approved goods available for purchase defined by the database for each of the plurality of accounts and to fund the corresponding prepaid financial balance for each of the plurality of accounts, a retail organization, separate from the distribution agency, including the plurality of affiliated retail settings, offering a plurality of goods for retail purchase at the plurality of affiliated retail settings, and issuing a plurality of financial transaction instruments for redemption, wherein:

each of the plurality of financial transaction instruments includes an identifier linking a respective one of the plurality of financial transaction instruments to a corresponding one of the plurality of accounts, each of the plurality of financial transaction instruments is provided by the retail organization to the distribution agency, wherein the distribution agency funds the corresponding prepaid financial balance for each of the plurality of accounts linked to the plurality of financial transaction instruments, the retail organization includes a point-of-sale processor positioned at one of the plurality of affiliated retail settings, and the point-of-sale processor is in communication with the database and is configured to apply at least a portion of the corresponding prepaid financial balance toward a purchase of consumer selected goods from the retail organization when a respective one of the plurality of financial transaction instruments is provided by a consumer, the consumer being separate from the distribution agency and the retail organization;

wherein the plurality of accounts each include expiration data specifying one of a date upon which any residual prepaid financial balance funded by the distribution agency to the corresponding one of the plurality of accounts becomes available for recapture by the distribution agency and an occurrence upon which any residual prepaid financial balance funded by the distribution agency to the corresponding one of the plurality of accounts becomes available for recapture by the distribution agency.

2. The system of claim 1, wherein the identifier is a bar code.

3. The system of claim 1, wherein the point-of-sale processor is configured to:
  access the corresponding one of the plurality of accounts for each of the plurality of financial transaction instruments using the identifier linking the respective one of the plurality of financial transaction instruments to the corresponding one of the plurality of accounts,
  determine if each one of the consumer selected goods for purchase is one of the approved goods as defined by the corresponding one of the plurality of accounts, and
  apply at least a portion of the corresponding prepaid financial balance of the corresponding one of the plurality of accounts toward the purchase of only the consumer selected goods determined to be approved goods.

4. The system of claim 1, wherein the retail organization includes the database.

5. The system of claim 4, wherein the retail organization receives funding from the distribution agency for the corresponding prepaid financial balance for each of the plurality of accounts, and the any residual prepaid financial balance is recaptured by the distribution agency from the retail organization.

6. The system of claim 4, wherein the plurality of financial transaction instruments can only be redeemed at the plurality of affiliated retail settings.

7. The system of claim 1, wherein the point-of-sale processor is adapted to substantially prevent application of the corresponding prepaid financial balance toward any consumer selected goods that are not determined to be approved goods.

8. The system of claim 1, wherein the corresponding one of the plurality of accounts defines a restricted good definition list such that goods falling within the restricted good definition list are precluded from being included as one of the approved goods.

9. The system of claim 1, wherein:
  the corresponding one of the plurality of accounts includes a transaction details field including a listing of particular identities of individual ones of the consumer selected goods purchased with the respective one of the plurality of financial transaction instruments linked to the corresponding one of the plurality of accounts, and
  the particular identities provide sufficient information so the individual ones of the consumer selected goods is identified beyond a category of the consumer selected goods.

10. The system of claim 1, wherein the retail organization further comprises:
  an administrator processor in communication with the database, the administrator processor being configured to support a website based upon the database, wherein the website is configured to facilitate access to and customization of the plurality of accounts by the distribution agency.

11. The system of claim 9, wherein:
  each of the plurality of accounts includes a transaction details field including a listing of all consumer selected goods purchased with the respective one of the plurality of financial transaction instruments linked to the corresponding one of the plurality of accounts, and
  the transaction details field is accessible via the website.

12. The system of claim 9, wherein the administrator processor is configured to enable access to the plurality of accounts via the website and is configured to enable use of the website by the distribution agency to define the approved goods and to define the prepaid financial balance of each of the plurality of accounts.

13. The system of claim 9, wherein:
  the administrator processor is configured to process orders for additional financial transaction instruments to be issued to the distribution agency, to generate a bill to the distribution agency for the additional financial transaction instruments to be issued to the distribution agency, and to credit the distribution agency for recaptured residual prepaid financial balances of the plurality of financial transaction instruments, and
  the bill includes a cost to the distribution agency for funding the prepaid financial balance for each of the additional financial transaction instruments.

14. The system of claim 1, wherein:
  the plurality of financial transaction instruments are distributed by the distribution agency to a first plurality of recipients;
  the retail organization includes an administrator processor in communication with the database and supporting a website based upon the database,
  the plurality of accounts are configured to be accessible by the distribution agency via the website such that following the one of the date and the occurrence specified by the expiration data, the distribution agency is able to initiate and complete recapture of any residual prepaid financial balance from each of the plurality of accounts via the website, and
  any recaptured residual prepaid financial balances are added to a credit account of the charitable organization such that any recaptured residual prepaid financial balances are available to fund one or more future financial transaction instrument distributions to a second plurality of financial transaction instrument recipients that differ from the first plurality of financial transaction instrument recipients.

15. A method for supporting machine readable vouchers and for accepting the machine readable vouchers toward purchases of items, the method comprising:
  maintaining a database storing a plurality of accounts;
  providing a plurality of machine readable vouchers to a distributing organization, each of the plurality of the machine readable vouchers including an identifier linking each of the plurality of machine readable vouchers to a different corresponding one of the plurality of accounts;
  receiving monetary value from the distributing organization to fully fund an initial prepaid financial balance for each of the plurality of accounts, wherein the distributing organization is configured to distribute each one of the plurality of machine readable vouchers to a different beneficiary to allow the different beneficiary to use the initial prepaid financial balance for the different corresponding one of the plurality of accounts linked to the one of the plurality of machine readable vouchers toward at least one purchase of one or more items offered for retail sale;

reading with a redemption terminal located at a retail site operated by a retail organization the identifier of the one of the plurality of machine readable vouchers presented at the redemption terminal;

accessing, via the redemption terminal, the different corresponding one of the plurality of accounts linked to the identifier read with the redemption terminal, wherein the database is electrically accessible via the redemption terminal;

applying up to all of the initial prepaid financial balance associated with the one of the plurality of machine readable vouchers toward a cost of at least some of selected items presented for purchase at the redemption terminal; and refunding to the distributing organization any of the initial prepaid financial balance funded by the distributing organization remaining in the different corresponding ones of the plurality of accounts after application of the one of the plurality of machine readable vouchers toward the cost if any of the initial prepaid financial balance funded by the distributing organization remains;

wherein all the operations of maintaining, providing, receiving, reading, accessing, applying, and refunding are performed by the retail organization.

16. The method of claim 15, wherein:

the different corresponding one of the plurality of accounts defines approved items for the different beneficiary, and the method further comprises:

determining whether selected items presented for purchase at the redemption terminal are approved items as defined by the different corresponding one of the plurality of accounts such that applying up to all of the initial prepaid financial balance associated with the one of the plurality of machine readable vouchers toward the cost of the at least some of the selected items includes applying up to all of the initial prepaid financial balance associated with the one of the plurality of machine readable vouchers toward only a cost of ones of the selected items determined to be approved items during the determining operation, and preventing use of any of the initial prepaid financial balance associated with the one of the plurality of machine readable vouchers toward a cost of ones of the selected items determined not to be approved items.

17. The method of claim 15, further comprising:

collecting data at the redemption terminal about the application of up to all of the initial prepaid financial balance associated with the one of the plurality of machine readable vouchers toward the cost of the ones of the selected items determined to be approved items, wherein the data includes details identifying individual ones of the selected items determined to be approved items; and storing the collected data to the different corresponding one of the plurality of accounts.

18. The method of claim 15, further comprising:

reporting the application of the one of the plurality of the machine readable vouchers toward the cost to the different corresponding one of the plurality of accounts; and updating the initial prepaid financial balance defined by the different corresponding one of the plurality of accounts based on the cost of the selected items determined to be approved items.

19. The method of claim 15, further comprising:

permitting access to the plurality of accounts via a website, wherein the website is configured to allow the distributing organization to order additional machine readable vouchers and to manage the plurality of accounts associated with the additional machine readable vouchers via a computer processing unit in electrical communication with the database via an Internet network.

20. The method of claim 15, wherein:

refunding to the distributing organization occurs upon receiving a request for refunding provided by the distributing organization to a website operated by the retail organization, the request follows a predetermined expiration date provided by the distributing organization for the corresponding one of the plurality of accounts, and refunding to the distributing organization includes:

refunding any of the initial prepaid financial balance funded by the distributing organization remaining in the corresponding different one of the plurality of accounts to a credit account provided by the retail organization for the distributing organization, and accepting funds in the credit account from the refunding to fund a prepaid financial balance of another one of the plurality of machine readable vouchers, the another one of the plurality of machine readable vouchers being provided by the distributing organization to a second beneficiary that differs from the different beneficiary provided the one of the plurality of machine readable vouchers.

* * * * *